United States Patent
Boyle et al.

(10) Patent No.: US 12,287,915 B2
(45) Date of Patent: Apr. 29, 2025

(54) CAMERA SYSTEM FOR PUPIL DETECTION AND EYE TRACKING

(71) Applicant: Sesame AI, Inc., San Francisco, CA (US)

(72) Inventors: Kevin Boyle, San Francisco, CA (US); Robert Konrad, San Francisco, CA (US); Nitish Padmanaban, Menlo Park, CA (US)

(73) Assignee: Sesame AI, Inc., San Francisco, CA (US)

( * ) Notice: Subject to any disclaimer, the term of this patent is extended or adjusted under 35 U.S.C. 154(b) by 0 days.

(21) Appl. No.: 17/987,444

(22) Filed: Nov. 15, 2022

(65) Prior Publication Data

US 2024/0160012 A1    May 16, 2024

Related U.S. Application Data

(63) Continuation of application No. 17/552,741, filed on Dec. 16, 2021, now Pat. No. 11,543,883.
(Continued)

(51) Int. Cl.
*G06F 3/01* (2006.01)
*G02B 27/00* (2006.01)
(Continued)

(52) U.S. Cl.
CPC ......... *G06F 3/013* (2013.01); *G02B 27/0093* (2013.01); *G06T 7/70* (2017.01);
(Continued)

(58) Field of Classification Search
CPC ...... A61B 3/113; G06V 40/19; G06V 40/193; G06F 3/013
See application file for complete search history.

(56) References Cited

U.S. PATENT DOCUMENTS 6,433,760 B1    8/2002    Vaissie et al.
8,824,779 B1    9/2014    Smyth
(Continued)

FOREIGN PATENT DOCUMENTS

GB    2596541 A    1/2022
GB    2597533 A    2/2022
(Continued)

OTHER PUBLICATIONS

Angelopoulos, A.N. et al. "Event Based, Near-Eye Gaze Tracking Beyond 10,000Hz," *IEEE Transactions on Visualization and Computer Graphics*, vol. 27, No. 5, Apr. 7, 2020, pp. 1-22.
(Continued)

*Primary Examiner* — Neil R Mikeska
(74) *Attorney, Agent, or Firm* — Fenwick & West LLP

(57) ABSTRACT

An event camera system for pupil detection may include a camera assembly and a controller, and may also include one or more off-axis light sources. The camera assembly may include one or more infrared (IR) light sources and an event camera. The one or more IR light sources are configured to emit pulses of IR light along an optical path toward an eyebox. The IR light is reflected from an eye in the eyebox, and the reflected light propagates back along the optical path toward the event camera for detection. The controller is configured to determine an orientation of the eye using data output from the event camera.

20 Claims, 11 Drawing Sheets

Related U.S. Application Data

(60) Provisional application No. 63/126,750, filed on Dec. 17, 2020.

(51) Int. Cl.
  *G02B 27/01* (2006.01)
  *G06T 7/70* (2017.01)
  *G06V 40/18* (2022.01)
  *H04N 23/71* (2023.01)
  *H04N 23/74* (2023.01)

(52) U.S. Cl.
  CPC ........... *G06V 40/193* (2022.01); *H04N 23/71* (2023.01); *H04N 23/74* (2023.01); *G02B 27/0172* (2013.01); *G06T 2207/10048* (2013.01); *G06T 2207/10152* (2013.01); *G06T 2207/30201* (2013.01)

(56) References Cited

U.S. PATENT DOCUMENTS

| | | | |
|---|---|---|---|
| 9,201,512 | B1 | 12/2015 | Raffle et al. |
| 10,466,779 | B1 | 11/2019 | Liu |
| 10,795,435 | B2 | 10/2020 | Fontanel et al. |
| 10,845,601 | B1 | 11/2020 | Meier |
| 11,150,469 | B2 | 10/2021 | Petljanski et al. |
| 11,164,019 | B1 | 11/2021 | Ryan et al. |
| 2001/0043163 | A1* | 11/2001 | Waldern ............. G02B 27/0093 345/7 |
| 2006/0110008 | A1 | 5/2006 | Vertegaal et al. |
| 2008/0267600 | A1 | 10/2008 | Omi |
| 2013/0106674 | A1 | 5/2013 | Wheeler et al. |
| 2013/0243258 | A1 | 9/2013 | Hennessey et al. |
| 2013/0300653 | A1 | 11/2013 | Lewis et al. |
| 2018/0120932 | A1* | 5/2018 | Sengelaub ............. A61B 3/113 |
| 2019/0179409 | A1 | 6/2019 | Jones et al. |
| 2019/0317597 | A1* | 10/2019 | Aleem .................... G06V 40/19 |
| 2020/0174263 | A1* | 6/2020 | Greenberg ......... G02B 27/0172 |
| 2020/0278539 | A1 | 9/2020 | Petljanski et al. |
| 2020/0348755 | A1 | 11/2020 | Gebauer et al. |
| 2021/0141449 | A1 | 5/2021 | Zhang et al. |
| 2021/0318558 | A1 | 10/2021 | Tzvieli et al. |
| 2021/0378504 | A1 | 12/2021 | Monti |
| 2021/0378509 | A1 | 12/2021 | Nistico |
| 2022/0003994 | A1 | 1/2022 | Petljanski et al. |
| 2022/0004253 | A1 | 1/2022 | Cappello et al. |

FOREIGN PATENT DOCUMENTS

| | | |
|---|---|---|
| JP | 2023-550538 A | 12/2023 |
| WO | WO 2012/055444 A1 | 5/2012 |
| WO | WO 2017/154370 A1 | 9/2017 |
| WO | WO 2020/064778 A2 | 4/2020 |
| WO | WO 2021/034527 A1 | 2/2021 |
| WO | WO 2022/066431 A1 | 3/2022 |
| WO | WO 2022/080058 A1 | 4/2022 |

OTHER PUBLICATIONS

Barua, S. et al. "Direct Face Detection and Video Reconstruction from Event Cameras." *IEEE Winter C1 Conference on Applications of Computer Vision*, Mar. 7-10, 2016, pp. 1-9.
Borsato, F.H. et al. "A Fast and Accurate Eye Tracker Using Stroboscopic Differential Lighting," *IEEE International Conference on Computer Vision Workshops*, Dec. 7-13, 2015, pp. 110-118.
PCT International Search Report and Written Opinion, PCT Application No. PCT/US2021/63734, May 4, 2022, 14 pages.
PCT Invitation to Pay Additional Fees, PCT Application No. PCT/US21/63734, Mar. 1, 2022, 2 pages.
Tobii Pro, "Dark and bright pupil tracking," Dec. 1, 2020, pp. 1-5, Retrieved from the internet <URL:http://web.archive.org/web/20201201051009/https://www.tobiipro.com/learn-and-support/learn/eye-trackingessentials/what-is-dark-and-briaht-pupil-trackina/>.
Japan Patent Office, Office Action with English Translation, Japanese Patent Application No. 2023-548561, Jan. 16, 2024, 10 pages.
United States Office Action, U.S. Appl. No. 17/987,454, filed Feb. 22, 2024, 12 pages.
European Patent Office, Extended European Search Report, European Patent Application No. 21907793.0, Jun. 24, 2024, eight pages.
The Japan Patent Office, Office Action, Japanese Patent Application No. 2024-097398, Nov. 19, 2024, six pages.

* cited by examiner

400

440

470

480

490

600

```
┌─────────────────────────────────────────────────────────────┐
│ Receive IR light from at least one off-axis light source    │
│ that reflects from an eye of a user                         │
│ 610                                                         │
└─────────────────────────────────────────────────────────────┘
                              ↓
┌─────────────────────────────────────────────────────────────┐
│ Emit a first pulse of IR light along an optical path over a │
│ first time period from a co-aligned light IR light source   │
│ 620                                                         │
└─────────────────────────────────────────────────────────────┘
                              ↓
┌─────────────────────────────────────────────────────────────┐
│ Detect, via an event camera, IR light reflected from the    │
│ eye along the optical path                                  │
│ 630                                                         │
└─────────────────────────────────────────────────────────────┘
                              ↓
┌─────────────────────────────────────────────────────────────┐
│ Identify a pupil of the eye from data values output from    │
│ the event camera                                            │
│ 640                                                         │
└─────────────────────────────────────────────────────────────┘
                              ↓
┌─────────────────────────────────────────────────────────────┐
│ Determine a gaze location of the user based in part on the  │
│ identified pupil                                            │
│ 650                                                         │
└─────────────────────────────────────────────────────────────┘
                              ↓
┌─────────────────────────────────────────────────────────────┐
│ Dynamically adjust illumination and/or camera settings to   │
│ optimize image quality and detection performance            │
│ 660                                                         │
└─────────────────────────────────────────────────────────────┘
```

FIG. 6

CAMERA SYSTEM FOR PUPIL DETECTION AND EYE TRACKING

CROSS-REFERENCE TO RELATED APPLICATIONS

This application is a continuation of co-pending U.S. patent application Ser. No. 17/552,741, filed Dec. 16, 2021, which claims the benefit of U.S. Provisional Application No. 63/126,750, filed on Dec. 17, 2020, the content of which is incorporated by reference herein in its entirety.

FIELD OF THE INVENTION

This disclosure relates generally to eye tracking, and more specifically to using an event camera system for pupil detection and eye tracking.

BACKGROUND

Eye-tracking systems capture images of the eyes in order to determine the 3D gaze of the user, or a 2D projection of that gaze onto a surface or plane, such as a screen or typical viewing distance. This is done either through a computer vision segmentation of the image of the eye into various parts, i.e. pupil, sclera, iris, eye lids, canthus, etc., the features of which are then exported as parameters that can be used to calculate the user's gaze based on calibration data or generate an eye model for the same purpose, or the eye images are fed directly into a neural network or other machine learning approach that infers the segmentation and/or user's gaze directly from the images based on a database of labeled eye images. The parameters extracted from a traditional computer vision approach can also be used with a machine learning approach, with or without the images of the eyes, which may also be scaled to various lower resolutions. In all cases, the quality of the images, with respect to contrast, lighting, sensitivity, etc., and the amount of computation required to extract the features of the eye or infer the gaze directly from the images is of first importance to the robustness and quality of the gaze estimate. This is especially true in a head-mounted, mobile system intended to operate both indoors and outdoors, in uncontrolled and variable lighting conditions. The complexity of extracting information from the eye images, especially the crucial pupil position, requires high complexity in the computer vision algorithms used for the task, and robustness to environmental effects on those images is the main challenge remaining for eye-tracking systems.

SUMMARY

An event camera system for pupil detection and eye tracking is disclosed. The event camera system may include a camera assembly and a controller, and may also include one or more off-axis light sources. In some embodiments, the camera assembly may include a co-aligned light source camera assembly ("co-aligned LSCA"). In some embodiments, the one or more off-axis light sources are not part of the event camera system, and instead the one or more off-axis light sources generate some or all of the ambient light. The camera assembly includes one or more infrared (IR) light sources and an event camera. The one or more IR light sources are configured to emit pulses of IR light along an optical path toward an eyebox. The IR light is reflected from an eye in the eyebox, and the reflected light propagates back along the optical path toward the event camera for detection. Likewise, in embodiments, including the one or more off-axis light sources, at least a portion of pulses of light emitted from the one or more off-axis light sources reflect off of the eye and surrounding facial regions, and propagate along the optical path toward the event camera for detection. Light reflected by the retina, by way of the pupil, from the one or more IR lights may increase the intensity on a pixel of a sensor of the event camera above a threshold level to detect an event. In contrast, light reflected by the eye or facial features surrounding the eye from the one or more off-axis sources may be tuned to be within the trigger threshold of the event camera such that it does not generate events. In some embodiments, a plurality of off-axis light sources are arranged in a ring shape about an axis of the event camera. The light reflected back to the sensor for each off-axis light source may correspond to a portion of a perimeter of the pupil. The event camera system may combine the data for each off-axis camera into a bright ring corresponding to the perimeter of the pupil. The controller is configured to determine an orientation of the eye using data output from the event camera.

In some embodiments, the eye tracking system includes a first infrared (IR) light source, an event camera, and a controller. The first IR light source is configured to emit a first pulse of IR light over a first time period. The first pulse of IR light is directed (e.g., via a co-axial LED or via a beam splitter) along an optical path towards an eyebox including an eye of a user. The eye reflects a portion of the first pulse of IR light back along the optical path at a first brightness towards a target area. The eye reflects IR light originating from an off-axis IR light source (e.g., another IR light source of the eye tracking system, IR light from a local area of the user, etc.) back along the optical path towards the target area at a second brightness. Light reflected to the event camera from the off-axis IR light source off the eye may remain relatively constant during the first time period. The event camera is located in the target area. The event camera is configured to detect IR light reflected from the eyebox along the optical path. The event camera includes a plurality of photodiodes. Each photodiode is configured to detect an intensity value corresponding to a portion of the reflected first pulse of IR light, and asynchronously output a data value that is based at least in part on a difference of a data value previously output by the photodiode and the intensity value detected by the photodiode relative to an intensity threshold value. The controller is configured to identify a pupil of the eye from data values output from the event camera resulting from the first pulse. The controller also is configured to determine a gaze location of the user based in part on the identified pupil.

In some embodiments, a method may comprise receiving, by a sensor of an event camera, infrared light from a plurality of off-axis light sources that reflects from an eye of a user; identifying a pupil of the eye from data values output from the event camera, wherein the identifying comprises detecting a bright ring corresponding to a perimeter of the pupil; and determining, based on the bright ring, a gaze location of the user.

BRIEF DESCRIPTION OF THE DRAWINGS

FIG. 6 is a flowchart illustrating a process for determining eye orientation using event camera system for differential pupil detection, in accordance with one or more embodiments.

Figure 1:
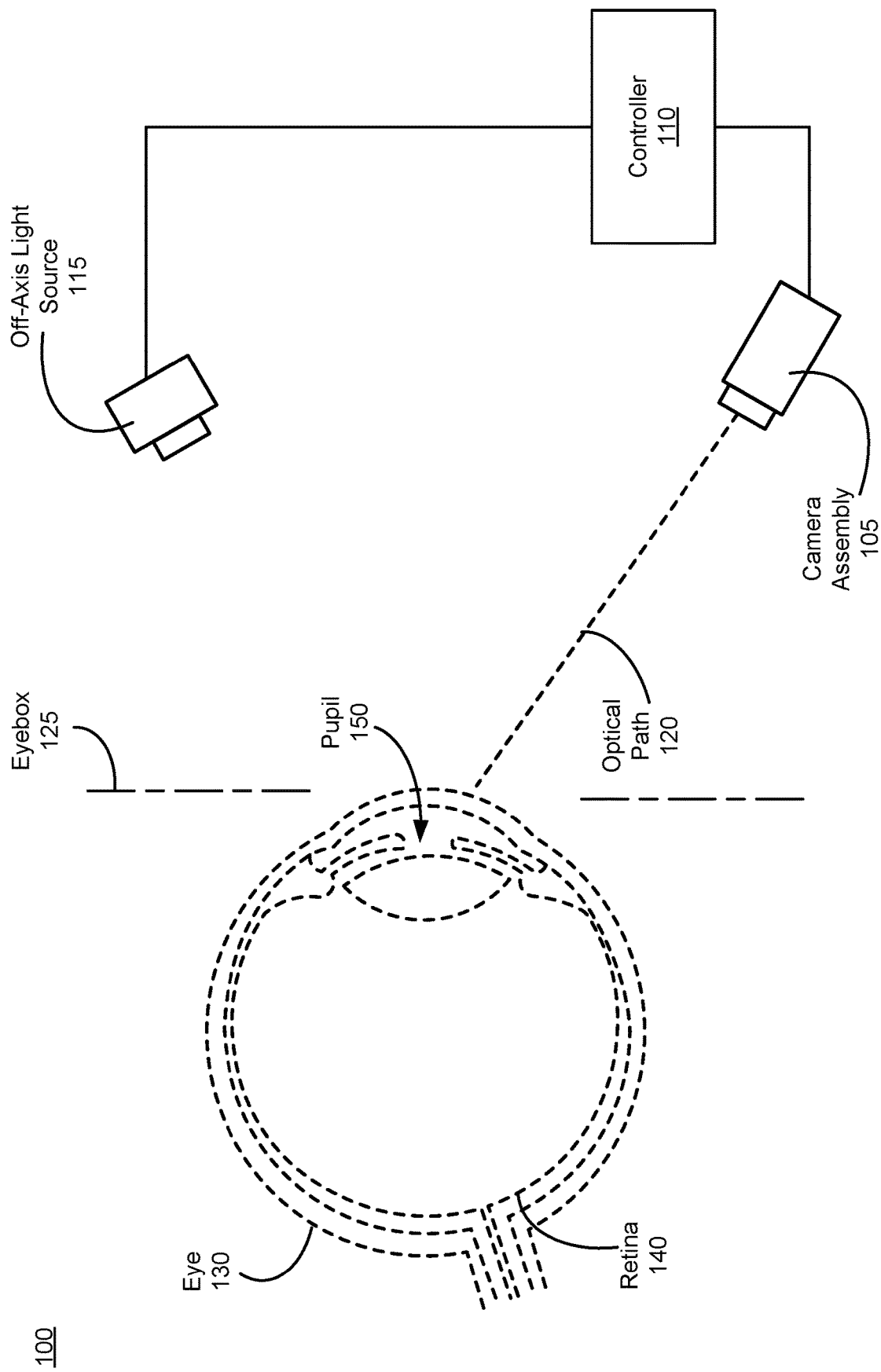
FIG. 1 is an event camera system for differential pupil detection, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

This is a system to use an event camera system to produce a high-contrast image of a pupil segmented from the background by exploiting the bright pupil reflex of the eye. In some embodiments, the event camera may include a co-aligned light source. When a light source hits the eye, the light that enters the pupil reflects off the curved retina such that the light returns to the source, which may be co-located with the camera sensor. This gives a characteristic bright pupil image in which the pupil is seen as high intensity values. In contrast, light from an off-axis source does not reflect off the retina to reach the camera, and instead produces a dark pupil image in which the pupil is seen as low intensity values relative to the rest of the image of the eye. Light from the off-axis source reflects off other portions of the eye and surrounding facial features to reach the camera sensor. The detected light reflected off the other portions of the eye and surrounding areas may stay constant or increase by minimal amounts in response to illumination of the pupil from the co-aligned light source, which may not result in events at these locations. The bright and dark pupil images may be subtracted to produce a high contrast image that only includes the pupil. With a traditional camera, this approach requires two separate images to be captured, which cannot be done sufficiently fast in practice to produce robust images of the pupil given the high speed of eye movements. By combining this technique with an event camera system, the system is able to capture and isolate only the changes in the eye image at the instant the illumination is switched between various bright pupil (co-aligned light source) and dark pupil (off-axis light source) combinations. This yields events that show only the high-contrast change in the pupil itself, greatly simplifying down-stream processing on the image output, especially compared to the complicated architecture usually required to analyze event camera system feeds.

The disclosed systems provide various benefits. In contrast to conventional video-based eye tracking, a sensor may use significantly less power to detect the pupil location at equivalent frame rates. Additionally, the processor may utilize significantly less power to analyze frames containing just a pupil detected by the event camera as opposed to analyzing entire video frames. Additionally, the disclosed systems are capable of tracking the pupil even when partially occluded or near other dark objects such as mascara, tattoos, or skin blemishes. In contrast conventional systems may mistake dark objects as being the pupil. Furthermore, conventional camera based systems have difficulty tracking the pupil if the camera is out of focus, such as if a headset moves closer or further from a user's eyes. In contrast, the present systems may detect the pupil location with the reflected light even if the camera assembly moves relative to the user's eyes.

In some embodiments, the system may activate the co-aligned light source while the off-axis light source is activated. The off-axis light source may create a high baseline of light reflecting off surfaces other than the pupil. In response to the co-aligned light source being activated, the event camera system may detect events at locations within the pupil. The high baseline of detected light at non-pupil locations may decrease the number of triggering events at those locations.

In some embodiments, the system may include multiple off-axis light sources and no co-aligned light source. The off-axis light sources may be arranged in a ring about an axis of the event camera. Off-axis light sources that are positioned close to the axis of the event camera may result in partial reflection from the off-axis light source off the retina to the event camera. Sensor data captured by each off-axis light source may result in a crescent shape at a portion of the edge of the pupil. Combining the data from all sensors may produce a bright ring at the perimeter of the pupil. The perimeter of the pupil may be used to determine the pupil diameter, pupil center, and gaze location.

FIG. 1 is an event camera system 100 for differential pupil detection, in accordance with one or more embodiments. The event camera system 100 may be integrated within a headset (e.g., as described in detail below with regard to FIGS. 7A and 7B), a tablet, a computer, a car dashboard, a television, a mobile device, some other system that uses eye tracking, or some combination thereof. The event camera system 100 includes at least one camera assembly 105 ("camera assembly 105"), a controller 110, and may optionally include one or more off-axis light sources (e.g., off-axis light source 115). In some embodiments, the camera assembly 105 may comprise a co-aligned light source and be referred to as a co-aligned light source camera assembly (LSCA).

A light source of the camera assembly 105 may emit and receive light along an optical path 120. The camera assembly 105 may include one or more infrared (IR) light sources (may be referred to as co-aligned IR source(s)) and one or more event cameras. The one or more IR light sources may be, e.g., a light emitting diode, a vertical cavity surface-emitting laser (VCSEL), some other IR or near IR light source, or some combination thereof. The one or more IR light sources generally are configured to emit light in the IR and/or near IR band. In some embodiments, there are a plurality of IR light sources, and at least two of the IR light sources emit in different optical bands. The one or more IR light sources are configured to emit pulses of IR light in accordance with instructions from the controller 110. The emitted pulses of light are directed such that they propagate along the optical path 120 toward an eyebox 125. The eyebox 125 is a region in space that would be occupied by an eye 130 of a user and may also include surrounding facial features, such as the eyelashes and skin surrounding the eye 130. In some embodiments, the camera assembly includes multiple IR light sources arranged in a ring about the optical path 120.

The camera assembly 105 may be co-aligned in the sense that the optical one or more IR light sources are substantially aligned with the optical paths for the one or more event cameras. The angle between optical paths of the of the one or more event cameras and optical paths of the one or more IR light sources is kept sufficiently small such that they can essentially overlap to form the optical path 120. Light emitted from the one or more IR light sources travels to the eye 130 and reflects from a retina 140 back along the optical path 120 to the one or more IR light sources and the one or more event cameras. The optical paths may be aligned to form the optical path 120 in a variety ways. For example, a beam-splitter or other optical mixing device within the camera assembly 105 may be used to align the optical paths, the one or more IR light sources and the one or more event cameras can be mounted side-by-side in the camera assembly 105 with a sufficiently small center-to-center spacing, the one or more IR light sources and the one or more event cameras may share a common substrate within the camera assembly 105 (e.g., a substrate with IR illumination pixels and sensing pixels interleaved), the one or more IR light sources may be coupled along the optical path to an optical element, such as a lens, or some combination thereof. The camera assembly 105 may also incorporate various optical filters including a band-pass filter specific to the wavelength of the light sources, a spatially-varying bandpass filter in the case of interleaved illumination and event camera pixels, or some combination thereof.

The IR light is reflected from the retina 140, and the reflected light propagates back along the optical path 120 toward the event camera within the camera assembly 105 for detection. The one or more event cameras (also commonly referred to as a dynamic vision sensor) are configured to detect an intensity value corresponding to IR light reflected from the eye 130 along the optical path 120. An event camera, of the one or more event cameras, includes a plurality of photodiodes, and each photodiode is configured to asynchronously output a data value that is based at least in part on a difference of a data value previously output by the photodiode and the intensity value detected by the photodiode relative to an intensity threshold value.

The one or more off-axis light sources emit light off-axis from the optical path 120 in accordance with instructions from the controller 110. The one or more off-axis light sources include the off-axis light source 115. An off-axis light source may be, e.g., a light emitting diode, a vertical cavity surface-emitting laser (VCSEL) some other IR or near IR light source, or some combination thereof. An off-axis light source is configured to emit light in the IR and/or near IR band. In some embodiments, the one or more off-axis light sources emit light at a same wavelength as the one or more IR sources of the camera assembly 105. In some embodiments, there are a plurality of off-axis light sources, and at least two of the off-axis light sources emit in different optical bands. The one or more off-axis light sources may be configured to emit pulses of IR light in accordance with instructions from the controller 110. The emitted pulses of light are directed such that they propagate toward the eyebox 125 along an optical path that is separate from the optical path 120. Note that in some embodiments, there are no off-axis light sources that are part of the event camera system 100, instead off-axis light is ambient light, and the one or more off-axis sources are the light sources that generate some or all of the ambient light.

The controller 110 controls components of the event camera system 100. The controller 110 may, e.g., control the activation and intensity of the one or more IR light sources, control the activation and intensity of the off-axis light source 115, and control the threshold settings and frame capture enable for the one or more event cameras. The one or more IR light sources and the one or more event cameras may be part of a single co-aligned LSCA 105 and/or part of several co-aligned LSCA 105s (e.g., one co-aligned LSCA 105 for each eye of the user). The controller 110 may adjust the intensity settings of the light sources (i.e., the one or more IR light sources and/or the off-axis light source 115) and threshold settings of the one or more event cameras dynamically according to the data values from the one or more event cameras; one or more separate external sensors (e.g., such as an ambient light sensing photodiode or a traditional camera imager also capturing images of the eye), or some combination thereof. The controller 110 may synchronize the activation of each light source (i.e., the one or more IR light sources and/or the off-axis light source 115) with the activation of the one or more event cameras, enabling the one or more event cameras to generate and output data values in a time window corresponding to a specific configuration of the illumination settings.

In some embodiments, the controller 110 sets the light sources (i.e., the one or more IR light sources and the off-axis light source 115) and one or more event cameras to capture data values with only the off-axis light source 115 activated. In these cases, a pupil 150 of the eye 130 and/or another eye of the user appear relatively dark in the data values that are processed by the controller 110. In some embodiments, the controller 110 sets the light sources and the one or more event cameras to capture data values with only the co-aligned light source 105 activated. In these cases, a pupil 150 of the eye 130 and/or another eye of the user appear relatively bright in the data values that are processed by the controller 110. In some embodiments, the controller 110 may capture only one of these two configurations, or multiple additional images with other configurations of light sources, including the off-axis light source 115 being either always on or always off. In some embodiments, the controller 110 sets the light sources and the one or more event cameras to capture data values while the off-axis light source 115 is active and the co-aligned light source 105 is switched from a deactivated state to an activated state. In these cases, a pupil 150 of the eye appear relatively bright in the data values that are processed by the controller 110.

The controller 110 reads data values from the one or more event cameras. The controller 110 processes the data values to identify a pupil of the eye. The controller 110 may determine eye orientation and/or gaze location of the eye based on the identified pupil.

In some embodiments, the event camera system 100 may be configured to detect the presence and location of eyes within a room. For example, the event camera system 100 may be located at a fixed position within a room. In some embodiments, the event camera system 100 may comprise integrated co-aligned and/or off-axis illuminators. In some embodiments, the event camera system 100 may comprise off-axis illuminators at different locations within the room. The event camera system 100 may be integrated within, for example, a television, phone, sign, or computer. The controller 110 may be configured to identify any pupils of eyes within the field of view of the event camera system. The controller 110 may determine a number of pupils detected within the room as well as a general gaze direction of the pupils, such as whether the pupils are looking in the direction of the event camera system 100. Detecting the bright pupils with the event camera system 100 may utilize much less processing power than processing full images to detect pupils. Room-scale tracking may be used for many applications, such as people counting, attention tracking, privacy preserving measures, or any other suitable scenario in which it may be beneficial to detect eyes.

Figure 2A:
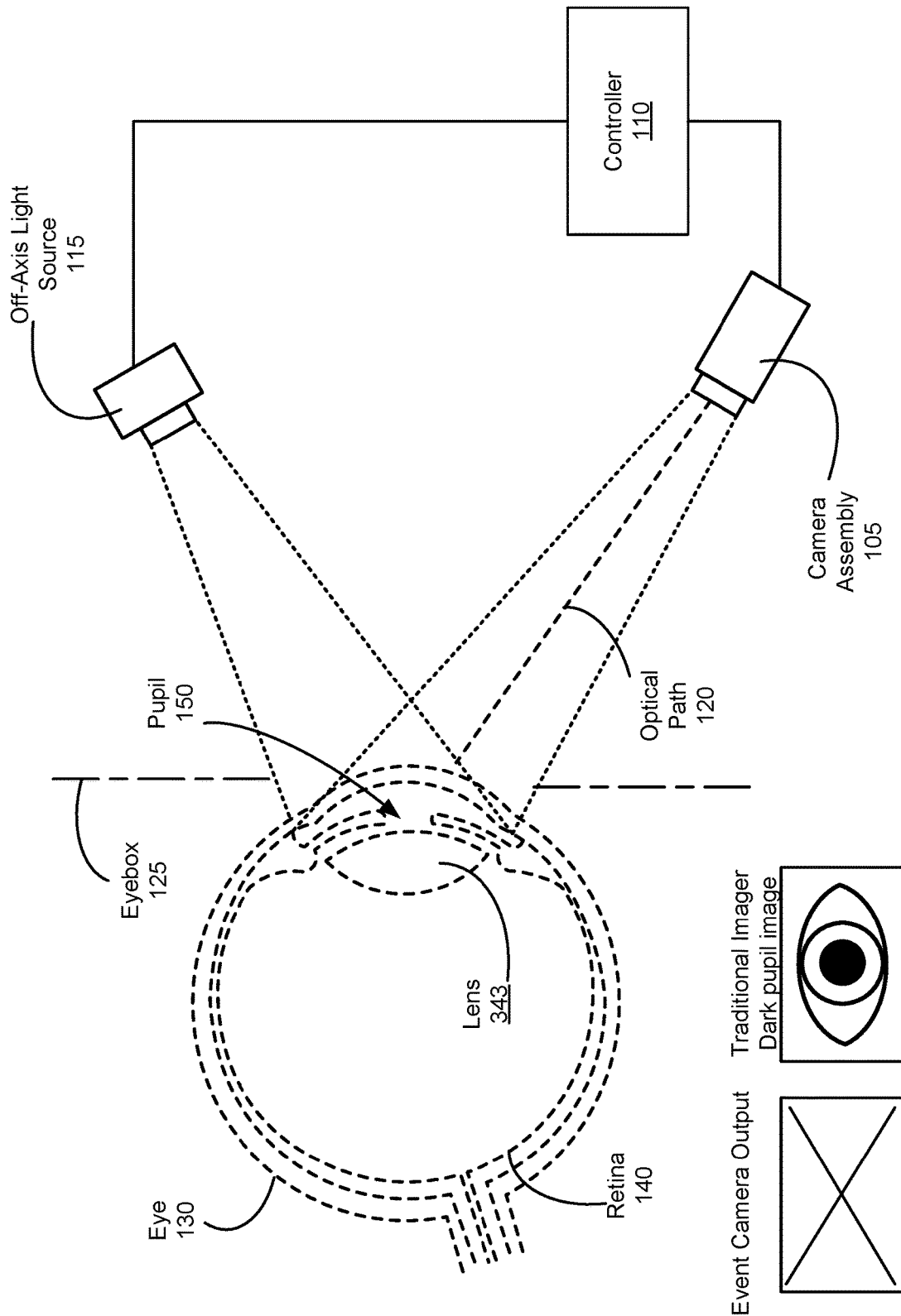
FIG. 2A is the event camera system of FIG. 1 at a first time period, in accordance with one or more embodiments.

FIG. 2A is the event camera system of FIG. 1 at a first time period, in accordance with one or more embodiments. In this first time period, the controller 110 activates the off-axis light source 115 and enables the event camera to output image data. Light from the off-axis light source 115 that reaches the pupil 150 and hits the curved retina 140 at the back of the eye 130 will reflect back through the pupil 150 to the light source, in this case at the off-axis light source 115 location. Some or all of this light will not reach an event camera at the camera assembly 105, while the rest of the light that reaches the eyebox 125 will reflect in all directions, including reaching the camera assembly 105. In a traditional imager this would produce a dark pupil image in which most features in the eyebox 125 are brightly illuminated, but the pupil 150 itself has relatively low intensity values due to the curved retina 140 acting as a retroreflector. In some embodiments, the output of the event camera is discarded at this time period, while in other embodiments the off-axis light source 115 may be turned on sufficiently long for the output of the event camera to show no changes. Note that pixels of the event camera responsive to a constant input do not output a data value or output a no-change value. In some embodiments the off-axis light source 115 activation in this time period may be neglected entirely.

In some embodiments, while the off-axis light source 115 is activated, the controller 110 may switch the camera assembly 105 from the deactivated state to the activated state. The pixels of the event camera may detect a change in the light reflected by the pupil 150 back to the camera assembly 105. Due to the light from the off-axis light source 115 being reflected by areas other than the pupil, the pixels of the event camera may not detect an event at locations other than the pupil. Thus, the event camera may output a bright pupil image.

Figure 2B:
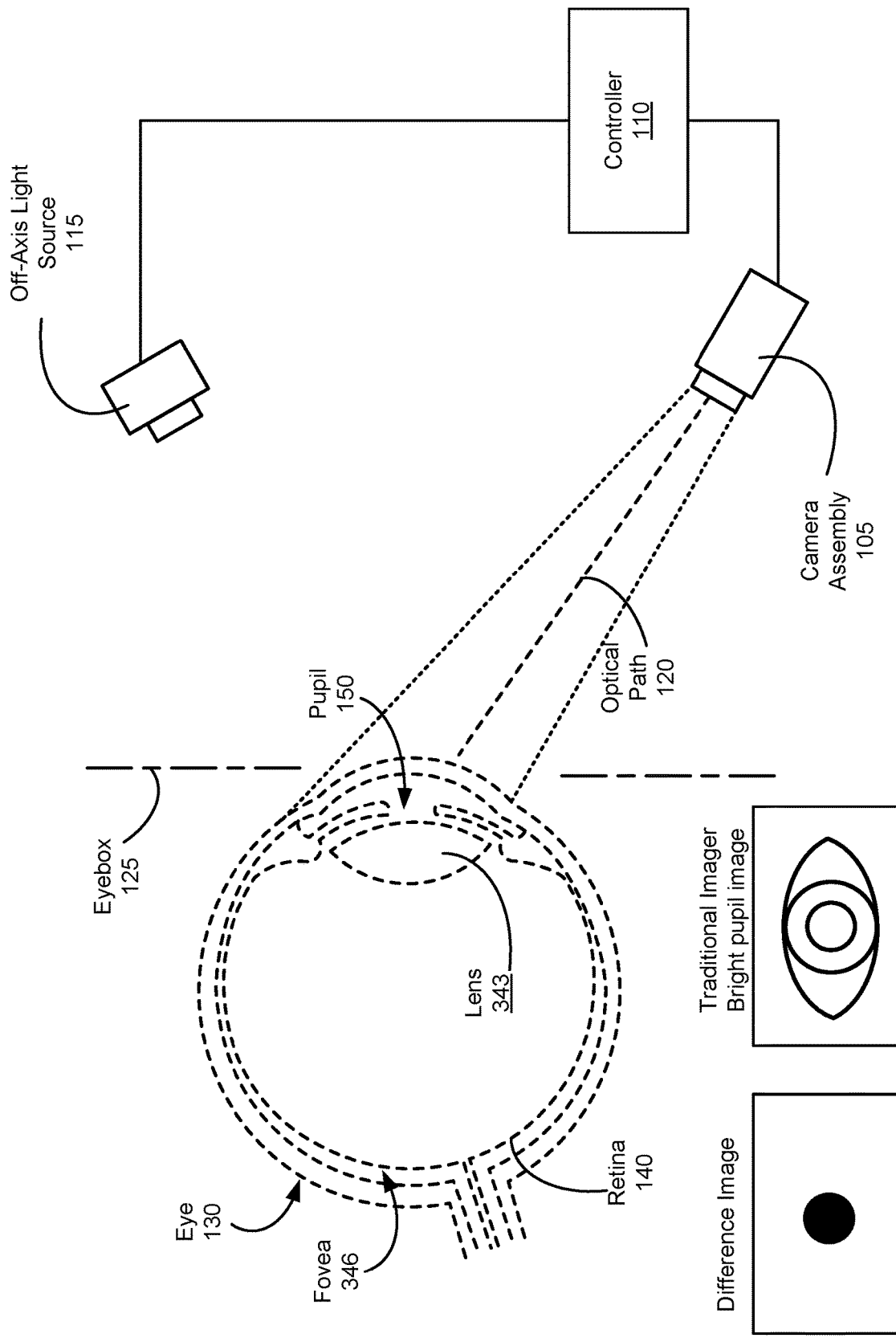
FIG. 2B is the event camera system of FIG. 1 at a second time period, in accordance with one or more embodiments.

FIG. 2B is the event camera system of FIG. 1 at a second time period, in accordance with one or more embodiments. In this second time period, the off-axis light source 115 is deactivated by the controller 110, and the one or more IR light sources in the camera assembly 105 are activated by the controller 110, and the event camera is enabled to output data values. Light from the one or more IR light sources that reach the pupil 150 will reflect from the curved retina 140 in the back of the eye 130 and pass back through the pupil 150 along the optical path 120 to the one or more event cameras of the camera assembly 105. The rest of the light that reaches the eyebox 125 reflects in all directions, including along the optical path 120 of the camera assembly 105. Because the majority of the light that enters the pupil 150 is retroreflected back to the camera assembly 105, the pupil 150 would appear relatively bright in a traditional imager compared to the rest of the image of the eye, producing a "bright pupil image." However, in an event camera, the transition from a "dark pupil" from the previous (first) time period characterized by the activation of the off-axis light source 115, to the "bright pupil" in this current (second) time period characterized by the activation of the co-aligned light source produces a pronounced difference image described by the data values output by the one or more event cameras. The difference image is localized to a region of including the pupil 150.

In some embodiments, the camera assembly 105 may detect glints from one or more light sources reflecting off a surface of the eye 130. The light sources may be the off-axis light source 115, the co-aligned light source of the camera assembly 105, or any other suitable light source. The controller 110 may analyze the glints in combination with the bright pupil image to determine a position of the eye 130. Different light sources may be strobed at different frequencies. The controller may determine that a glint detected at a first location corresponds to a first light source based on the frequency of the detected glint. Similarly, the controller may determine that a glint detected at a second location corresponds to a second light source based on the frequency of the detected glint at the second location.

Figure 3A:
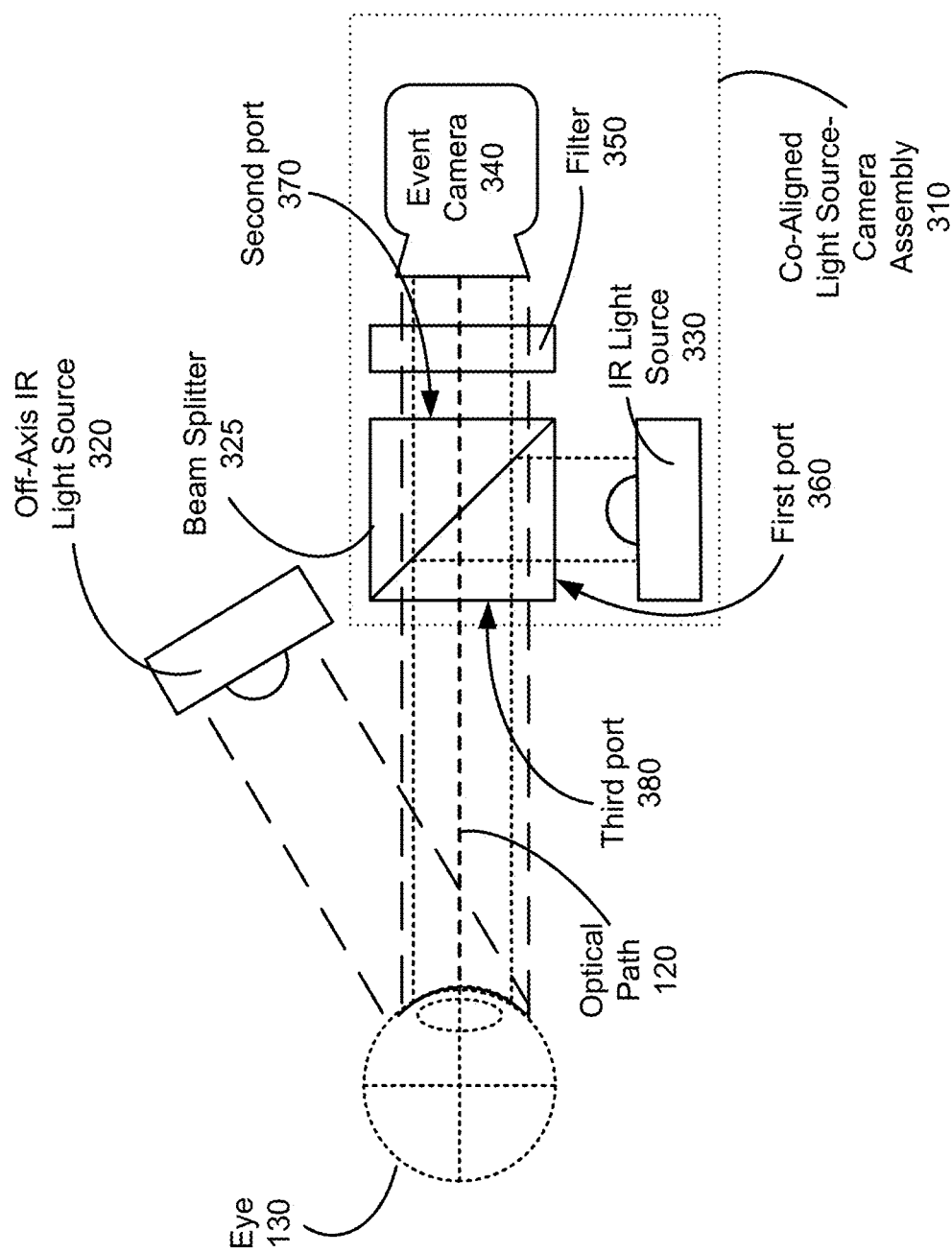
FIG. 3A is an example showing optical paths for an off-axis light source and a co-aligned LSCA that includes a beam splitter, in accordance with one or more embodiments.

FIG. 3A is an example showing optical paths for an off-axis light source and a co-aligned LSCA 310 that includes a beam splitter 325, in accordance with one or more embodiments. The beam splitter 325 includes a first port 360, a second port 370, and a third port 380. In this embodiment, the beam splitter 325 passes receives light from the IR light source 330 at the first port 360, and redirects at least a portion of the received light out of the beam splitter 325 at the third port 380 in a forward direction along the optical path 120 towards the eye 130. A portion of the light returning from the eye 130 is received at the beam splitter 325 at the third port 380, and the beamsplitter directs a portion of the received light out of the second port 370 towards an event camera 340 of the co-aligned LSCA 310. This configuration allows the optical path 120 of the IR light source 330 at the first port 360 of the beam splitter 325 to be exactly co-aligned with the optical path 120 of the event camera 340 at the second input port 370 of the beam splitter 325. This ensures the light from the IR light source 330 is retroreflected from a retina of the eye 130 and that the retroflected light reaches the event camera 340. Light from the off-axis IR light source 325 can reflect in all directions from the eye 130 and still reach the event camera 340.

As illustrated, the co-aligned LSCA 310 includes a filter 350 that is configured to transmit light in a narrow band that includes a wavelength of the light emitted by the IR light source 330 and light emitted by the off-axis IR light source 320, and attenuate other wavelengths of light. In this manner, the filter 350 attenuating ambient light received at the event camera 340. And while illustrated as being separate from the event camera 340, in alternate embodiments, the filter 350 may be integrated into the event camera 340.

In alternate embodiments, the beam splitter 325 is omitted and alignment of the optical path 120 of the IR light source 330 and event camera 340 is approximately matched by placing the IR light source 330 and event camera 340 side-by-side with a sufficiently small center-to-center spacing such that the light from the IR light source 330 that passes through a pupil of the eye 130 and is retroreflected from the retina back to the co-aligned LSCA 310 is also received at the event camera 340.

Likewise, as discussed above with regard to FIG. 1, in some embodiments, the beam splitter 320 is omitted, and the IR light source 330 is replaced with a plurality of IR illumination pixels that are interleaved with sensing pixels, and the IR illumination pixels and the sensing pixels share a common substrate. The IR illumination pixels function in the same manner as the IR light source 330 in that they illuminate the eye 130 via the optical path 120. And the sensing pixels are the pixels of the event camera. As such the functionality of the event camera 340 and the IR light source 330 are combined and integrated into a single device that includes both sensing pixels and IR illumination pixels on a common substrate.

Figure 3B:
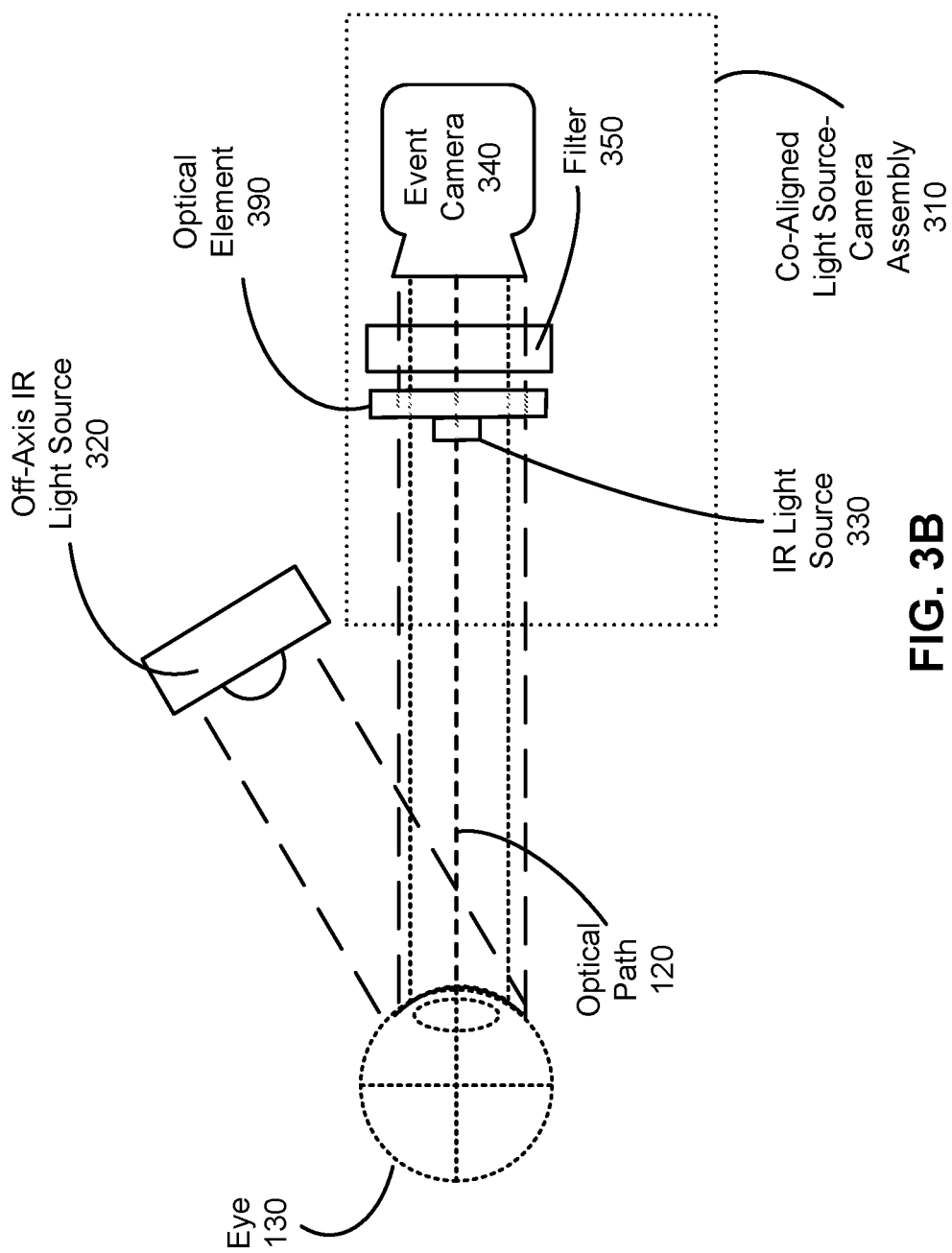
FIG. 3B is an example showing optical paths for an off-axis light source and a co-aligned LSCA that includes a miniaturized light source in the optical path of an event camera, in accordance with one or more embodiments.

FIG. 3B is an example showing optical paths for an off-axis light source and a co-aligned LSCA that includes a miniaturized light source in the optical path of an event camera, in accordance with one or more embodiments. The IR light source 330 may be coupled to an optical element 390. The optical element 390 may comprise a lens, window, mirror, grating, or any other suitable optical element. In some embodiments, the optical element 390 is a lens. The IR light source 330 may be along a central axis of the optical path 120. The IR light source 330 may be small relative to the lens 390, such as occupying less than 1% or less than 5% of the area of the lens 390. In some embodiments, the IR light source 330 may have a diameter of less than 3 mm, less than 1 mm, less than 100 microns, or less than 10 microns. Thus, the IR light source 330 may only minimally occlude the sensor of the event camera 340.

Figure 4A:
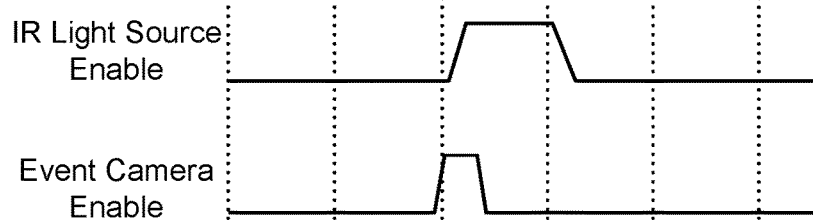
FIG. 4A is an example timing diagram for an event camera system for differential pupil detection for a single frame, according to one or more embodiments.

FIG. 4A is an example timing diagram 400 for an event camera system (e.g., the event camera system 100) for differential pupil detection for a single frame, according to one or more embodiments. Here the scene begins with only ambient illumination from the environment. In this case—the off-axis source(s) may be thought of sources that are not controlled by the event camera system and produce some or all of the ambient light. A controller (e.g., the controller 110) then enables data value output from an event camera of a camera assembly (e.g., of the camera assembly 105), then enables (turns on) a co-aligned IR light source of the camera assembly, and later disables data value output from the event camera. The enabled pulse for the IR light source may have a pulse width of no more than 1 second, and may be much shorter. For example, an overall "frame rate" or period of the whole system may be 30 Hz (roughly 33 ms period). In that case the pulse width is 10 ms with a corresponding pulse rate of 50 or 100 Hz at <50% duty cycle. In some embodiments, the duty cycle may be greater than 0% and less than 100%. The event camera thus outputs data values during the transition of the co-aligned IR light source from off to on, which due to the bright pupil effect shows a large change in intensity values in pixels that include a pupil of the eye. The controller then sets a threshold of the event camera such that small background changes are not reported by the event camera in the data values that are output. The controller may furthermore group all events from the time period where the event camera enable is activated into a single "frame" analogous to a traditional image frame. For example, data values would include a timestamp of a magnitude of a change at a specific pixel at a specific time, and the controller would group the data values as a single 2D matrix covering all pixels that reported changes during this entire time period, much like a traditional camera. In some embodiments, the event camera enable is configured to capture the falling edge of the illumination signal instead of the rising edge.

Note that in FIG. 4A, the event camera is enabled at a same time period covering activation of the IR light source. In other embodiments, the timing could be modified such that the event camera is enabled at a time period covering de-activation of the IR light source (i.e., going from emitting light to not emitting light).

Figure 4B:
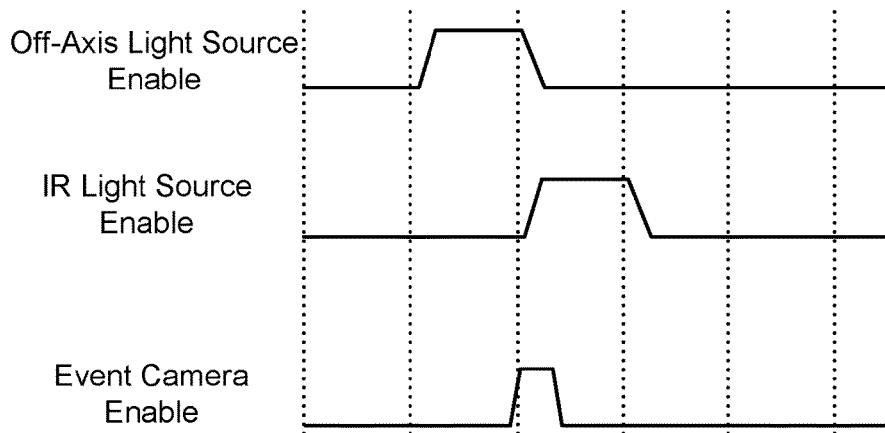
FIG. 4B is an example timing diagram for an event camera system for differential pupil detection including an off-axis light source for a single frame, according to one or more embodiments.

FIG. 4B is an example timing diagram 440 for an event camera system (e.g., the event camera system 100) for differential pupil detection including an off-axis light source (e.g., the off-axis light source 115) for a single frame, according to one or more embodiments. In this case, a controller (e.g., the controller 110) first enables (turns on) the off-axis light source, and then enables data value output from an event camera of a camera assembly (e.g., of the camera assembly 105). While the event camera is enabled, the controller disables (turns off) the off-axis light source and enables (turns on) an IR light source of the camera assembly. This triggers data value output that shows a large transition in intensity values at a pupil (e.g., the pupil 150) from dark pupil to bright pupil illumination. The controller may then disable data value output from the event camera and then disable (turn off) the IR light source of the camera assembly. The data values output from the event camera during this time period may be grouped together into a single "frame" that describes changes in image data during the synchronized switching of the light sources.

Figure 4C:
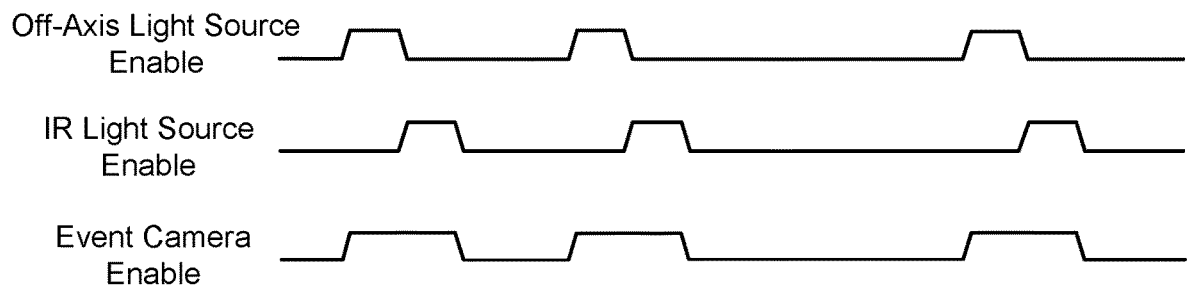
FIG. 4C is an example timing diagram for an event camera system for differential pupil detection for multiple frames, according to one or more embodiments.

FIG. 4C is an example timing diagram 470 for an event camera system (e.g., the event camera system 100) for differential pupil detection for multiple frames, according to one or more embodiments. A controller (e.g., the controller 110) may capture multiple frames by repeating the sequence of IR light source enable signals and event camera enable signals according to whichever embodiment is implemented. These frames may be requested at a fixed framerate by periodically strobing the illumination and enabling the event camera output, or frames may be requested at variable timings that are dynamically selected by the controller 110 by strobing the illumination at the desired times. Note that as illustrated the event camera enable time period is longer than, e.g., the event camera enable period shown in FIG. 4B. In other embodiments, the event camera enable period may be similar to what is shown in FIG. 4B.

The controller may instruct the IR light source of the co-aligned LSCA, and in some cases the one or more off-axis IR light sources, to each emit a plurality of pulses at respective pulse lengths and duty cycles, and periodically enable the event camera of the co-aligned LSCA to capture data values. The controller may generate image frames using data values output as a result of each respective pulse of the IR light source, and tracks an orientation of the eye based in part on the generated image frames.

Figure 4D:
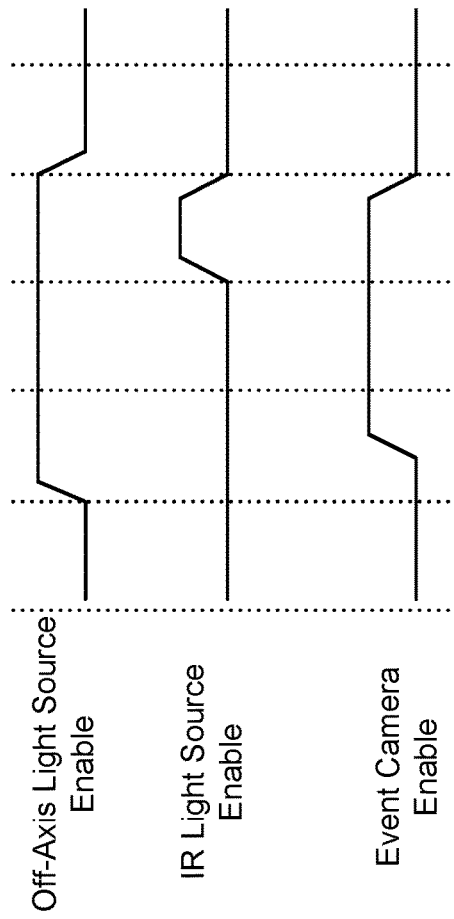
FIG. 4D is an example timing diagram for an event camera system including an off-axis light source where the IR light source is enabled during illumination by the off-axis light source.
Figure 4E:
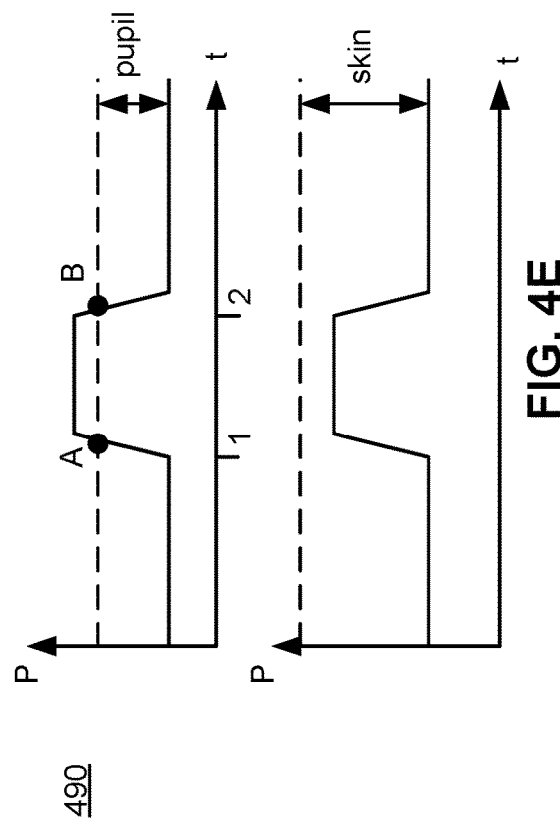
FIG. 4E is an example illuminance diagram of the relative increase in illuminance for pixels corresponding to the pupil and pixels corresponding to the skin.

FIG. 4D is an example timing diagram 480 for an event camera system (e.g., the event camera system 100) for differential pupil detection including an off-axis light source (e.g., the off-axis light source 115) for a single frame, according to one or more embodiments. In this case, a controller (e.g., the controller 110) first enables (turns on) the off-axis light source, and then enables data value output from an event camera of a camera assembly (e.g., of the camera assembly 105). While the event camera is enabled, the controller enables (turns on) an on-axis IR light source of the camera assembly. This triggers data value output that shows a large transition in intensity values at a pupil (e.g., the pupil 150) without triggering data value outputs at non-pupil locations due to the reflected light from the off-axis light source. For example, as shown in FIG. 4E in the presence of an off-axis light source, when the on-axis light source is enabled at t=1, the pixel illuminance P corresponding to pupil locations crosses an event threshold (shown by the dashed line) at point A. However, the pixel illuminance P corresponding to skin locations does not cross the event threshold, because due to bias from the off-axis illumination, the amount of light reflected back from the on-axis lights source is not enough to raise the pixel illuminance above the threshold level. In some embodiments, the controller may modulate the intensity of the camera assembly multiple times during a single frame to potentially trigger multiple events. For example, the intensity of the IR source of the camera assembly may be modulated in a square wave pattern, triangle wave pattern, or some combination thereof. Regardless of the shape of the pulse, the amplitude of the pulse may be modulated one or more times during a frame such that the amplitude of the signal is sufficient that the event threshold is crossed one or more times during the frame. In some embodiments, the intensity of the camera assembly may gradually increase in a ramp during the single frame. The controller may then disable data value output from the event camera and then disable (turn off) the IR light source of the camera assembly. The controller may then disable (turns off) the off-axis light source. The data values output from the event camera during this time period may be grouped together into a single "frame" that describes changes in image data during the synchronized switching of the light sources.

Figure 5A:
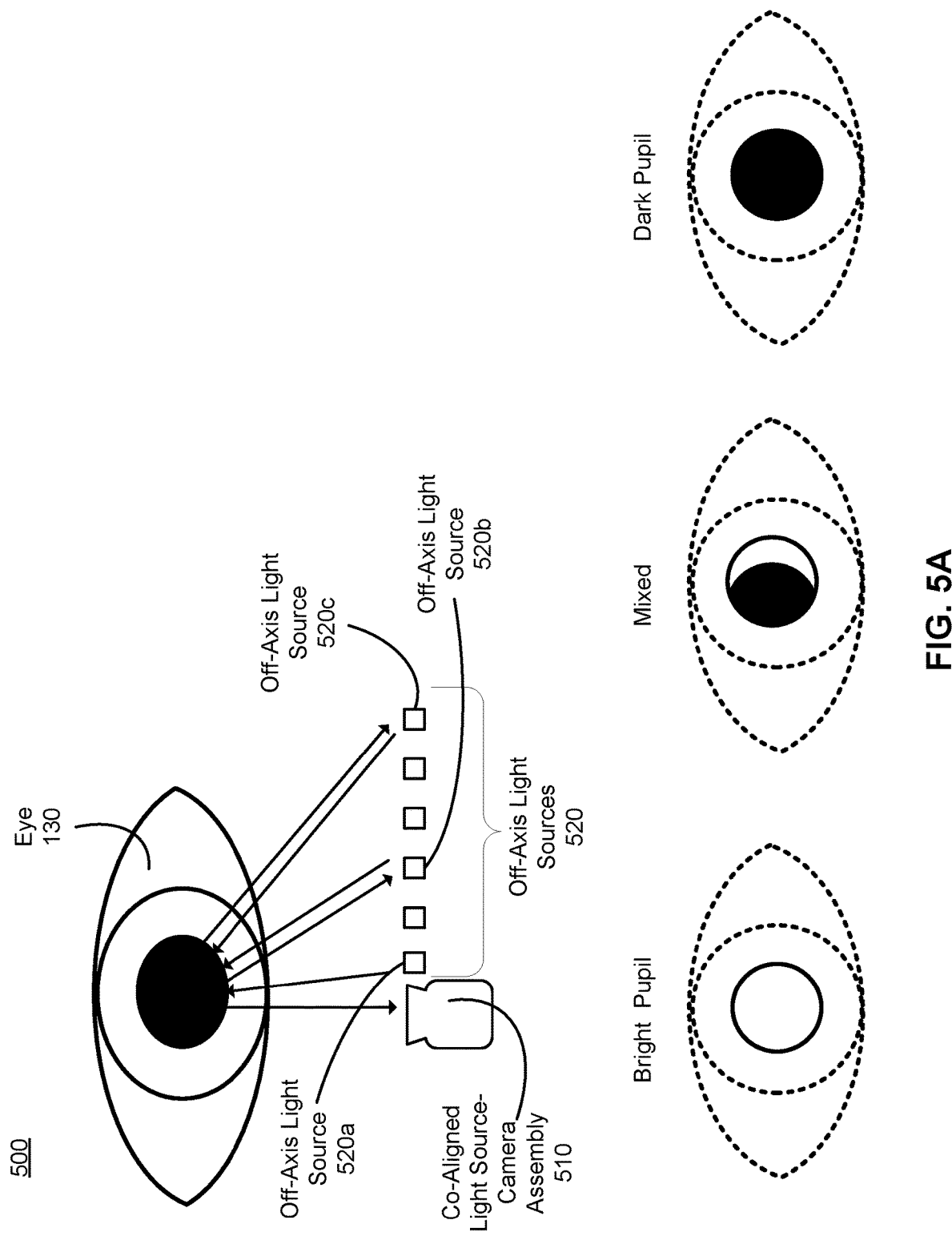
FIG. 5A is an event camera system for differential pupil detection that includes a plurality of off-axis light sources, in accordance with one or more embodiments.

FIG. 5A is an event camera system 500 for differential pupil detection that includes a plurality of off-axis light sources, in accordance with one or more embodiments. The event camera system 500 may be an embodiment of the event camera system 100. The event camera system 500 includes a plurality of off-axis light sources 520, a co-aligned LSCA 510, and a controller (not shown). The co-aligned LSCA 510 is substantially the same as the camera assembly 105. The off-axis light sources 520 are an embodiment of the off-axis light sources of FIG. 1 where the off-axis light sources are arranged in positions of increasing distance from the co-aligned LSCA 510. The off-axis light sources 520 may be placed in multiple locations in order to accommodate extremes in gaze directions and corresponding pupil and eye orientations.

In some embodiments, controller may instruct the co-aligned LSCA 510 and the off-axis light sources 520 to sequentially emit light while collecting data values from an event camera of the co-aligned LSCA 510. In this manner data values resulting from changes in illumination of a pupil of the eye caused by different off-axis light sources—of increasing distance from the co-aligned LSCA 510 are captured. Note that, a co-aligned IR light source in the co-aligned LSCA 510 still results in a bright pupil image of the eye 130 as light is reflected directly back from the eye 130 to the event camera of the co-aligned LSCA 510. Similarly, light from the furthest off-axis light sources 520*c* still result in a dark pupil image as the light source is sufficiently off-axis that light that enters the pupil does not reach the co-aligned LSCA 510. Off-axis light sources that are positioned closely (e.g., off-axis light source 520*a*) to the co-aligned LSCA 510 may be sufficiently aligned with the event sensor to still detect an image that closely resembles a properly aligned bright pupil image, but off-axis light sources between these extremes (e.g., the off-axis light source 520*b*) exhibit a mixed bright pupil response, in which only a portion of the pupil reflects light back to the event camera from a given off-axis light source location.

The controller can measure the bright pupil response for a plurality of off-axis light sources 520 to analyze when the resulting image is a bright pupil image, a mixed image, or a dark pupil image. Based on the known angular tolerances of the bright pupil effect and the known relative locations of the off-axis light sources 520 and the co-aligned LSCA 510, the controller 110 can estimate the distance from the co-aligned LSCA 510 to the eye 130. The distance from the co-aligned LSCA 510 to the eye 130, and therefore the distance for all other fixed parts of the system to the eye 130, may be used to extract geometric information about the relative position of sensors on the event camera system and the user's eyes. This may be incorporated into an eye model to increase accuracy of the measurement or used as calibration information. This distance along with event camera intrinsics may also be used to calculate quantitative features of the eye 130, such as the size or the user's interpupillary distance (IPD), which in turn is an important metric for calculating gaze distance from the vergence state of the eyes. Additionally, in some embodiments the multiple off-axis light sources may be used to select the ideal individual light source or sources to properly illuminate a given users eyes despite variations in face shape and the relative fit of the eye tracking system.

Figure 5B:
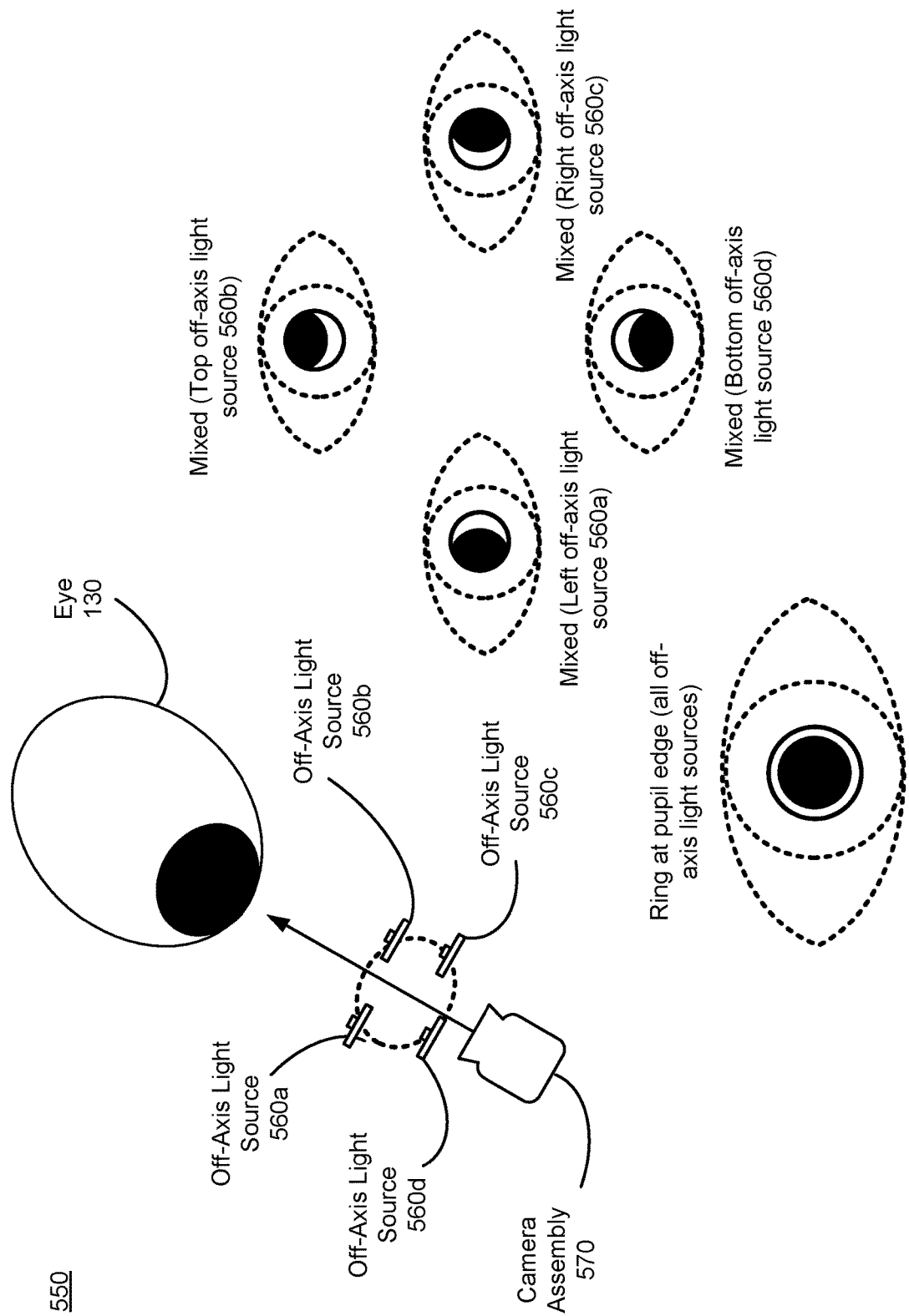
FIG. 5B is an event camera system for differential pupil detection that includes a plurality of off-axis light sources in a ring pattern, in accordance with one or more embodiments.

FIG. 5B is an event camera system 550 for differential pupil detection that includes a plurality of off-axis light sources, in accordance with one or more embodiments. The event camera system 550 may be an embodiment of the event camera system 100. The camera system 550 includes a plurality of off-axis light sources 560, a camera assembly 570, and a controller (not shown). The camera assembly 570 may be an embodiment of the camera assembly 105. However, in some embodiments, the camera assembly 570 does not include a co-aligned light source. The off-axis light sources 560 may be placed in multiple locations that are slightly off-axis from the camera assembly 570. The light from each off-axis light source 560 may partially reflect off the retina and reflect back to the camera assembly 570, resulting in a crescent shaped pattern at the perimeter of the pupil. In some embodiments there may be two, three, four, six, eight, or any other suitable number of off-axis light sources 560. The off-axis light sources may be equally spaced in a ring about the axis of the camera assembly 570.

In some embodiments, the controller may instruct the off-axis light sources 560 to sequentially emit light while collecting data values from an event camera of the camera assembly 570. In this manner data values resulting from changes in illumination of a pupil of the eye caused by different off-axis light sources—of different angular locations about the axis of the camera assembly 570—are captured. Off-axis light sources 560*a*, 560*b*, 560*c*, 560*d* exhibit a mixed bright pupil response, in which only a portion of the pupil reflects light back to the event camera from a given off-axis light source location. By combining the response from each of the off-axis light sources, the controller may detect a bright ring at the edge of the pupil. In some embodiments, the controller may strobe the off-axis light sources 560 one at a time in a sequence and combine the sensor responses. In some embodiments, the controller may activate all off-axis light sources 560 simultaneously. By detecting only the locations at the edge of the pupil, the controller may decrease the amount of processing power used to estimate the gaze direction of the eye 130. The location of the edge of the pupil may be sufficient to calculate pupil diameter, shape, and center location. By detecting events at the edge of the pupil, the event camera system 550 may use less processing power by analyzing only the pixels corresponding to the edge of the pupil versus the entire pupil.

FIG. 6 is a flowchart illustrating a process for determining eye orientation using event camera system 600 for differential pupil detection, in accordance with one or more embodiments. Embodiments may include different and/or additional steps, or perform the steps in different orders. The event camera system 600 may be an embodiment of the event camera system 100.

The event camera system 600 receives 610, at an event camera of a camera assembly (e.g., the camera assembly 105), IR light from at least one off-axis light source that reflects from an eye of a user. The eye is within an eyebox of the event camera system 600. In some embodiments, the off-axis light source is ambient light. In other embodiments, the off axis light source is part of the event camera system 600, and the event camera system previously instructed the off-axis light source to emit the IR light (e.g., as one or more IR light pulses) over a time period that at least partially overlaps with a second time period over which the event camera is enabled. In some embodiments, the off-axis light source comprises a plurality of light sources arranged in a ring around an axis of the camera assembly.

The event camera system 600 optionally emits 620 a first pulse of IR light along an optical path over a first time period from a co-aligned IR source. Note that the first time period overlaps with the time period that the event camera is enabled, and in embodiments where the off-axis source is part of the event camera system, the first time period slightly overlaps with the time period in which the off-axis light source is enabled (e.g., as shown in FIGS. 4B and 4C above). The light is emitted from a co-aligned IR light source that is within the camera assembly. The first pulse of IR light is directed along the optical path towards the eyebox. A retina of the eye reflects a portion of the first pulse of IR light back along the optical path at a first brightness towards a target area. Note that in this case the IR light is essentially being retroreflected from the retina of the eye, as such a brightness of the light is brighter than light reflected by the eye from the off-axis source.

The event camera system 600 optionally detects 630 IR light reflected from the eyebox along the optical path. The event camera system 600 detects the IR light using the event camera. The event camera includes a plurality of photodiodes, and each photodiode is configured to: detect an intensity value corresponding to a portion of the reflected IR light, and asynchronously output a data value that is based at least in part on a difference of a data value previously output by the photodiode and the intensity value detected by the photodiode relative to an intensity threshold value. Because the event camera measures a differences in detected light, the event camera outputs data values corresponding to the transition from relatively low brightness of IR light reflected by the eye from the off-axis source to the relatively high brightness of IR light retroreflected by the retina from the IR source within the camera assembly.

The event camera system 600 identifies 640 a pupil of the eye from data values output from the event camera. As noted above the event camera outputs a difference image. In some embodiments, the light reflected from each off-axis light source and detected by the sensor generates a crescent shape corresponding to a portion of a perimeter of the pupil. By combining the sensor data for each off-axis light source, whether sequentially or simultaneously, the event camera system detects a bright ring shape corresponding to the perimeter of the pupil.

In some embodiments, the difference image is associated with the change in brightness caused by retroreflection of light from the co-aligned IR light source. As such, the data values output by the event sensor describe among other things a shape of the pupil. Note that a shape of the pupil changes as a function of an orientation of the eye. In some embodiments, the controller may perform a series of low-level image operations including subtraction, dilation, spatial filtering or ellipse fitting to determine the location of the pupil. In some embodiments some or all of these low-level image operations are implemented in the controller 110 in hardware accelerated electronics while some operations may be implemented in software. In some embodiments, the controller generates an image using the data values, and uses shape recognition to identify the pupil in the generated image.

The event camera system 600 determines 650 a gaze location of the user based in part on the identified pupil. In some embodiments, the event camera system 600 uses an eye model that maps different shapes of the pupil of one or both eyes to different gaze locations. A gaze location in this context may be, e.g., a location in space where the gaze of both eyes intersect (i.e., vergence point).

The event camera system 600 dynamically adjusts 660 illumination and/or camera settings to optimize image quality and detection performance. The controller may, e.g., increase or decrease brightness of light emitted by light sources (i.e., the co-aligned IR source and/or the one or more off-axis light sources), adjust periods of time over which the light sources are active, adjust periods of time over which the event camera is active, adjust which of the one or more off-axis sources are active, adjust a threshold for pixels of the event camera to report a change, or some combination thereof. As such, the controller may use the above to mitigate and in some cases eliminate background noise from the image to optimize pupil position detection.

Figure 7A:
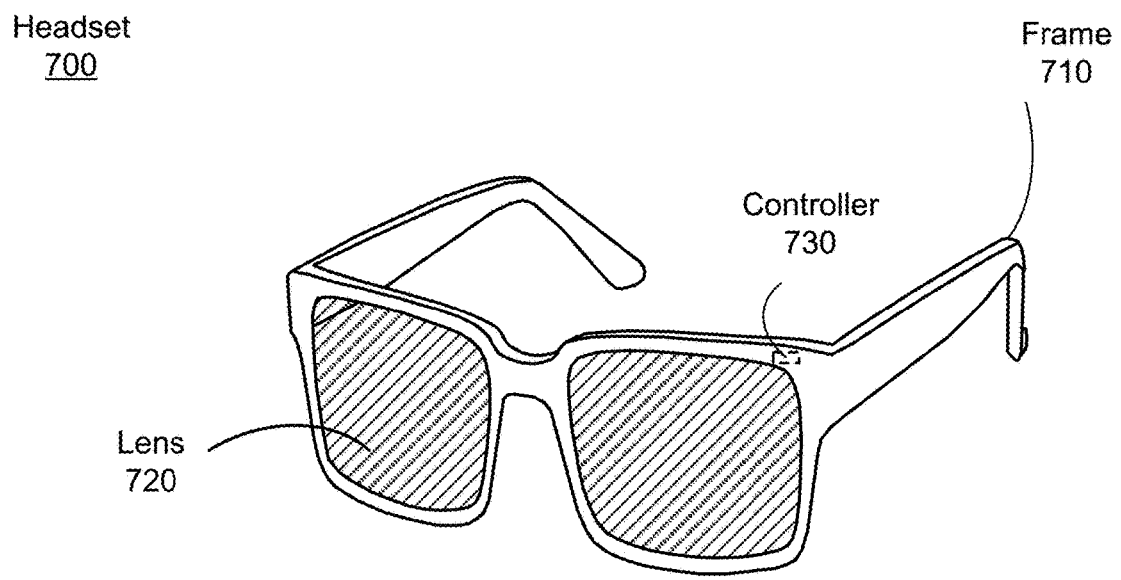
FIG. 7A is a perspective view of a headset including the event camera system for differential pupil detection, in accordance with one or more embodiments.
Figure 7B:
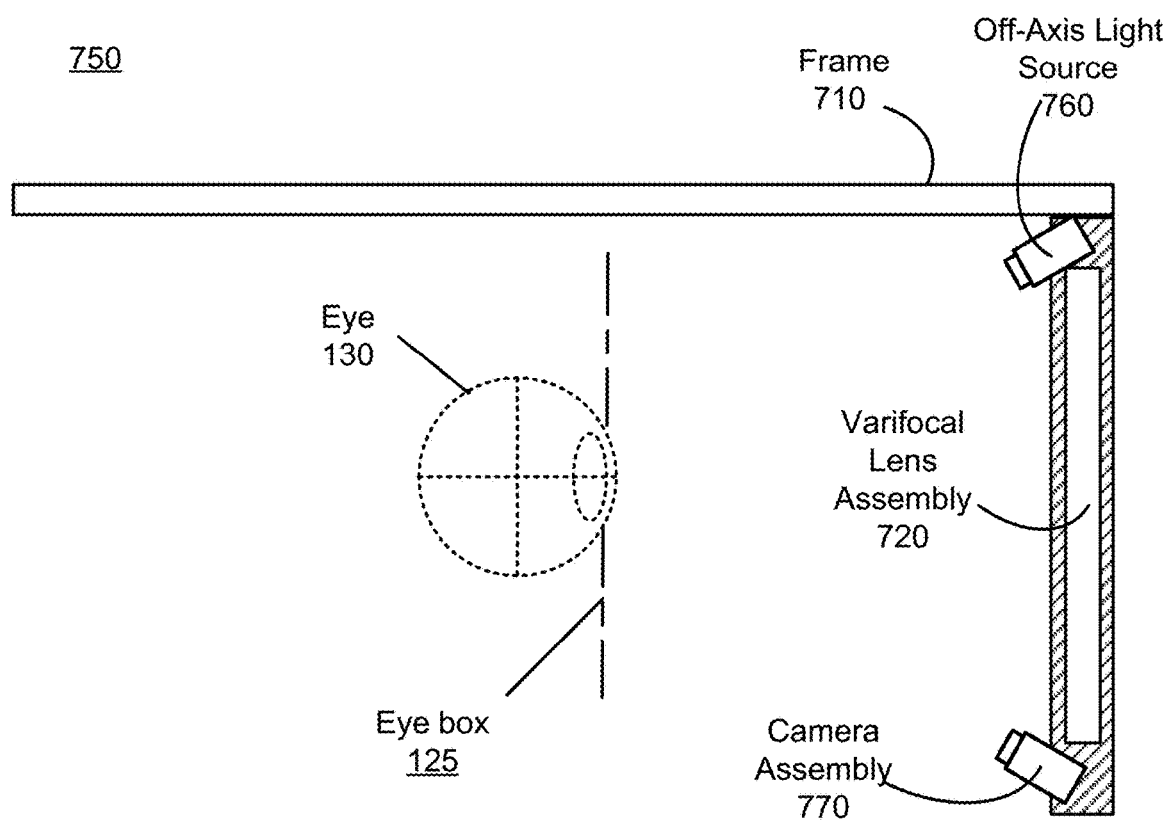
FIG. 7B is a cross section of the headset of FIG. 7A.

FIG. 7A is a perspective view of a headset 700 including an event camera system for differential pupil detection, in accordance with one or more embodiments. FIG. 7B is a cross section of the headset of FIG. 7A. The headset 700 may perform eye tracking for various purposes. In some embodiments, the eye tracking may be used to determine one or more health metrics of a user.

In some embodiments, the headset 700 includes a varifocal optical system. The varifocal optical system may dynamically adjust its focal length in accordance with an estimated gaze location of a user of the headset. The varifocal optical system may include a varifocal lens assembly 720 for each eye. A varifocal lens assembly 720 dynamically adjusts its focal length based on a gaze location of the user. A varifocal lens assembly 720 includes one or more optical elements of variable focal length that operate alone or together such that the varifocal lens assembly has a range of focal lengths. The range of focal lengths allows the varifocal lens assembly 720 to provide variable optical power. The range of optical power may include negative optical powers, zero optical power, positive optical powers, or some combination thereof. In some embodiments, the range of optical power is continuous (e.g., from 0-3 Diopters). In some embodiments, the range of optical power is discrete (e.g., 0 to 3 Diopters in increments of 0.1 Diopters). And in some cases, the discrete ranges of optical power may be set to correspond to certain distances from the user (e.g., reading distance, computer distance, and more than 20 feet away). An optical element of variable focal length may be, e.g., Alvarez lens, a liquid lens, a liquid crystal lens, some other lens with a dynamically adjustable focal length, or some combination thereof. In some embodiments, the varifocal lens assembly may also include one or more optical elements of fixed focal length and/or prisms.

The event camera system is an embodiment of the event camera system 100. The event camera system includes an off-axis light source 760, a camera assembly 770, and a controller 730. The off-axis light source 760, the camera assembly 770, and the controller 730 are embodiments of the off-axis light source 115, the camera assembly 105, and the controller 110.

In some embodiments, the varifocal lens assembly 720 may be configured to be autofocused based on a position of the eyes 130. The user's eyes 130 are naturally viewing a 3D scene in which an object must be brought into focus by the biological adjustment of the lens in the eye, as well as the eyes 130 rotating such that each has the foveal axis aligned with the object. The rotation of the eyes 130 is known as vergence, which is an indication of the distance to the object. As described above with regard to, e.g., FIGS. 1, 2A, 2B, 4A-C, 5A, 5B, and 6, the off-axis light source 760 and the camera assembly 770 can be used to gather image data from the eye 130 including the pupil position, which the controller 730 computes from the data values output by an event camera of the camera assembly 770. The pupil position for each eye can be used to calculate the user's gaze location (i.e., vergence), and therefore the distance they are looking to. The controller 730 uses this estimate to drive the focus state of the varifocal lens assembly 720 in order to match the optical power of the lens to a distance to the estimated gaze location.

In some embodiments, the headset 700 is configured to obtain health metrics of a user based on eye position. As described above with regard to, e.g., FIGS. 1, 2A, 2B, 4A-C, 5A, 5B, and 6, the off-axis light source 760 and the camera assembly 770 can be used to gather image data from the eye 130 including the pupil position, which the controller 730 computes from the data values output by an event camera of the camera assembly 770. The pupil position for each eye can be used to calculate the user's gaze location. The controller 730 may use this estimate to track the user's gaze location for any suitable purpose.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An eye tracking system comprising:
 a first light source that emits a first pulse of light over a first time period, the first pulse of light directed along an optical path towards an eye of a user, a surface of the eye reflecting a portion of the first pulse of light back as reflected light along the optical path at a first brightness towards a target area;
 a camera located in the target area, the camera and the first light source aligned with the optical path, the camera including a plurality of sensing pixels, each sensing pixel of a subset of the plurality of sensing pixels configured to:
  detect an intensity value corresponding to a portion of the reflected light, and
  responsive to the detected intensity value above a threshold level, output a data value representing a difference between a previous intensity value detected by each sensing pixel of the subset of sensing pixels and the detected intensity value; and
 a controller configured to:
  group data values output by the subset of sensing pixels into a two-dimensional matrix,
  identify a pupil of the eye based on the data values grouped into the two-dimensional matrix, and
  determine a gaze location for the eye based at least in part on the identified pupil.

2. The eye tracking system of claim 1, further comprising:
a second light source positioned off-axis to the optical path and configured to emit a second pulse of light, and the controller is further configured to:
instruct the second light source to emit the second pulse of light over a second time period that partially overlaps with the first time period.

3. The eye tracking system of claim 2, wherein a portion of the second pulse of light is reflected from the surface of the eye back along the optical path towards the target area at a second brightness that is less than the first brightness.

4. The eye tracking system of claim 1, wherein the first light source emits the first pulse of light off-axis to the optical path, and the eye tracking system further comprising:
a beam splitter positioned within the optical path and configured to:
redirect at least a portion of the first pulse of light to propagate substantially along the optical path, and
transmit the portion of the first pulse of light reflected from the surface of the eye back along the optical path towards the camera.

5. The eye tracking system of claim 1, wherein the threshold level is such that the data value at least partially identifies the pupil.

6. The eye tracking system of claim 1, wherein the controller is further configured to instruct the first light source to emit the first pulse of light.

7. The eye tracking system of claim 1, wherein the controller is further configured to instruct the first light source to emit a plurality of pulses of light with a predetermined pulse rate at a defined duty cycle, the plurality of pulses of light including the first pulse of light.

8. The eye tracking system of claim 1, wherein the controller is further configured to instruct the first light source to emit a plurality of pulses of light at a plurality of time instances dynamically selected by the controller.

9. The eye tracking system of claim 1, wherein the controller is further configured to:
instruct the first light source to emit a plurality of pulses of light including the first pulse of light;
generate a respective image frame of a plurality of image frames using data values generated by the camera as a result of emitting each of the plurality of pulses of light and reflection from the surface of the eye; and
track an orientation of the eye based in part on the generated plurality of image frames.

10. The eye tracking system of claim 1, wherein:
the camera is configured to detect a glint from the first light source reflected off the surface of the eye; and
the controller is further configured to determine the gaze location further based on the detected glint.

11. The eye tracking system of claim 1, further comprising a second light source positioned off-axis to the optical path and configured to emit a second pulse of light, wherein:
the camera is further configured to detect glints from the first and second light sources reflected off the surface of the eye, and
the controller is further configured to determine the gaze location further based on the detected glints.

12. A method comprising:
emitting, by a first light source, a first pulse of light over a first time period, wherein the first pulse of light is directed along an optical path towards an eye of a user, a surface of the eye reflecting a portion of the first pulse of light back as reflected light along the optical path at a first brightness towards a target area;
detecting, by each sensing pixel of a subset of a plurality of sensing pixels in a camera located in the target area, an intensity value corresponding to a portion of the reflected light, the camera and the first light source aligned with the optical path;
responsive to the detected intensity value above a threshold level, outputting, by each sensing pixel of the subset of sensing pixels, a data value representing a difference between a previous intensity value detected by each sensing pixel of the subset of sensing pixels and the detected intensity value;
grouping data values output by the subset of sensing pixels into a two-dimensional matrix;
identifying a pupil of the eye based on the data values grouped into the two-dimensional matrix; and
determining a gaze location for the eye based at least in part on the identified pupil.

13. The method of claim 12, further comprising:
instructing a second light source positioned off-axis to the optical path to emit a second pulse of light over a second time period that partially overlaps with the first time period; and
reflecting a portion of the second pulse of light from the surface of the eye back along the optical path towards the target area at a second brightness that is less than the first brightness.

14. The method of claim 12, further comprising:
emitting, by the first light source, the first pulse of light off-axis to the optical path;
redirecting, by a beam splitter positioned within the optical path, at least a portion of the first pulse of light to propagate substantially along the optical path; and
transmitting, by the beam splitter, the portion of the first pulse of light reflected from the surface of the eye back along the optical path towards the camera.

15. The method of claim 12, further comprising:
instructing the first light source to emit the first pulse of light having a pulse width of no more than 1 second.

16. The method of claim 12, further comprising:
instructing the first light source to emit a plurality of pulses of light with a predetermined pulse rate at a defined duty cycle, the plurality of pulses of light including the first pulse of light.

17. The method of claim 12, further comprising:
instructing the first light source to emit a plurality of pulses of light at a plurality of time instances that are dynamically selected.

18. The method of claim 12, further comprising:
instructing the first light source to emit a plurality of pulses of light including the first pulse of light;
generating a respective image frame of a plurality of image frames using data values generated by the camera as a result of emitting each of the plurality of pulses of light and reflection from the surface of the eye; and
tracking an orientation of the eye based in part on the generated plurality of image frames.

19. The method of claim 12, further comprising:
detecting, by the camera, a glint from the first light source reflected off the surface of the eye; and
determining the gaze location further based on the detected glint.

20. The method of claim 12, further comprising:
instructing a second light source positioned off-axis to the optical path to emit a second pulse of light;
detecting, by the camera, glints from the first and second light sources reflected off the surface of the eye; and determining the gaze location further based on the detected glints.

* * * * *